United States Patent
Tada et al.

[11] Patent Number: 5,108,069
[45] Date of Patent: Apr. 28, 1992

[54] METAL DIAPHRAGM VALVE

[75] Inventors: Kouki Tada; Kazushi Ohhashi, both of Tokyo, Japan

[73] Assignee: Benkan Corporation, Tokyo, Japan

[21] Appl. No.: 773,110

[22] Filed: Oct. 8, 1991

[30] Foreign Application Priority Data

Aug. 9, 1991 [JP] Japan .................. 3-225099

[51] Int. Cl.$^5$ .............. F16K 31/122; F16K 7/17
[52] U.S. Cl. .................. 251/58; 74/527; 74/579 R; 251/63.5; 251/63.6; 251/263; 251/297; 251/331
[58] Field of Search .............. 74/527, 579 R; 251/58, 251/63.5, 63.6, 289, 251, 263, 297, 331, 335.2

[56] References Cited

U.S. PATENT DOCUMENTS

| | | |
|---|---|---|
| 3,542,332 | 11/1970 | Chevalier .................. 251/63.6 |
| 4,194,718 | 3/1980 | Baker et al. .................. 74/527 |
| 4,309,022 | 1/1982 | Reinicke et al. .................. 251/297 |
| 4,519,576 | 5/1985 | Winegeart .................. 251/58 |
| 4,549,719 | 10/1985 | Baumann .................. 251/263 |
| 4,609,178 | 9/1986 | Baumann .................. 251/251 |
| 4,684,103 | 8/1987 | Baumann .................. 251/58 |
| 4,700,735 | 10/1987 | Hamernik .................. 251/58 |
| 4,729,544 | 3/1988 | Baumann .................. 251/263 |
| 4,828,219 | 5/1989 | Ohmi et al. .................. 251/63.5 |
| 4,867,201 | 9/1989 | Carter .................. 251/331 |

Primary Examiner—Walton George L.
Attorney, Agent, or Firm—Eric P. Schellin

[57] ABSTRACT

A metal diaphragm valve includes a valve casing, a diaphragm made of an elastic material and having an upward bulge in the center and a valve system in which the diaphragm is operated to close or establish a fluid-flow relationship between an inlet passage and an outlet passage both mounted in the casing. The valve system is separated by the diaphragm from the casing and comprises a vertically shiftably disposed push rod adapted to directly move the diaphragm, a plurality of steel balls arranged in a circular groove of a V-shaped cross section defined in the top surface of the push rod, a vertically movably disposed drive rod having a tapered lower end portion situated above the center of the groove and place in constant contact with the steel balls, and a drive means adapted to move the drive rod. The groove has an outer concentric slope and an inner concentric slope, and the steel balls are normally made to stay in the inner slope of the groove. When the drive means is actuated to cause the drive rod to move lower, the tapered end portion forces the steel balls to move outwardly into the outer slope. The force exerted on the balls by the tapered end portion is transmitted to the push rod, which in turn depresses the diaphragm to close the fluid-flow relationship between the inlet passage and outlet passage.

8 Claims, 6 Drawing Sheets

F I G. 2
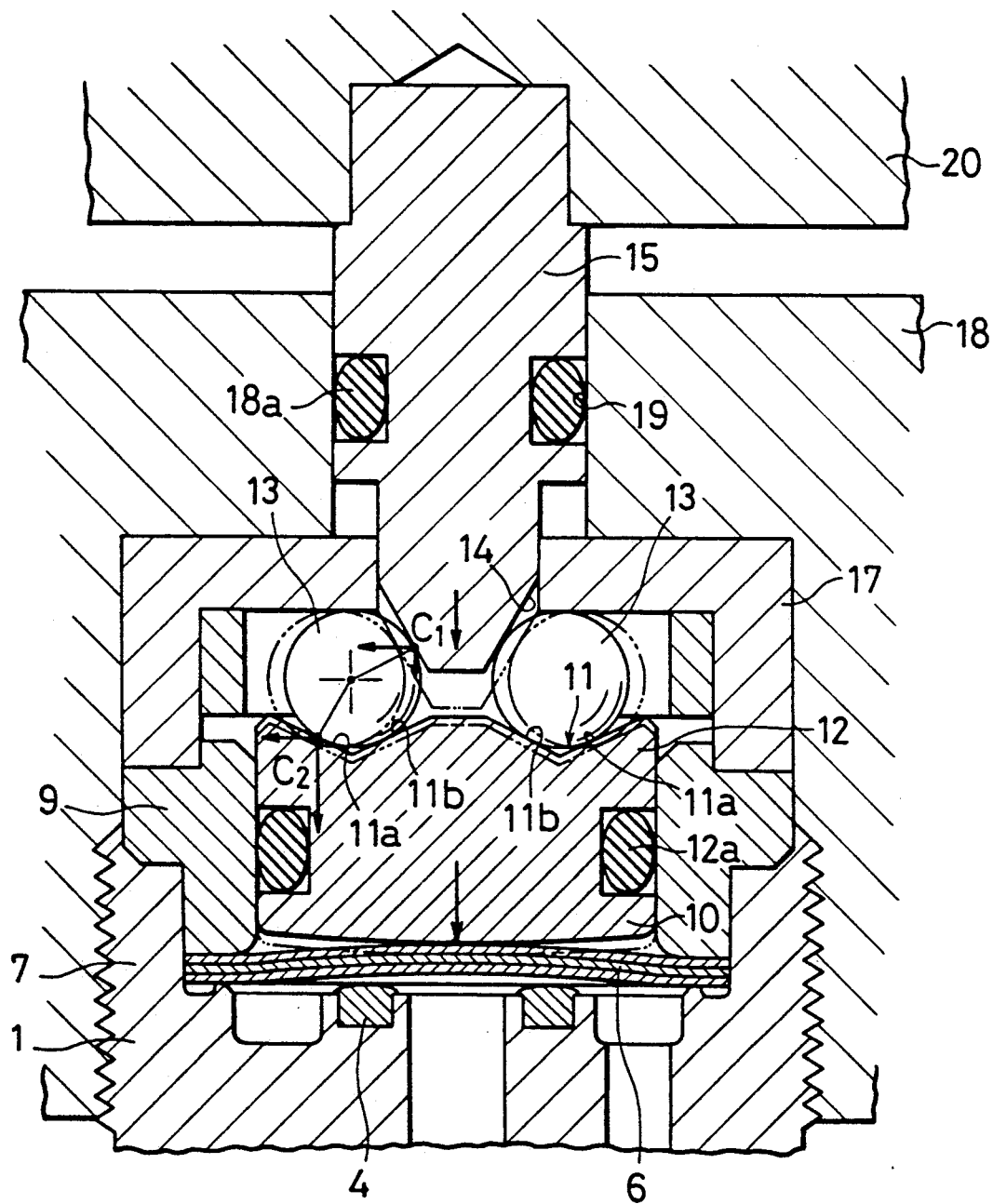

METAL DIAPHRAGM VALVE

BACKGROUND OF THE INVENTION

1) Field of the Invention

This invention relates in general to a metal diaphragm valve for gas supply pipings, and more particularly to such a valve for use in semiconductor chip manufacturing facilities.

2) Description of the Prior Art

There has been increasing demand for micronized metal diaphragm valves for the gas pipings of semiconductor chip manufacturing equipments. Since such a valve is normally operated under extremely highly pressurized condition, the valve is required to develop force enough to overcome the pressure of the hydraulic system exerted on the diaphragm particularly when the valve is actuated to bring the diaphragm toward the valve seat. In conventional technologies, large pneumatic cylinders have been employed to generate high pressure to actuate the diaphragms. Another attempt made to develop large pneumatic pressure for metal diaphragm valves is the type which uses dual pneumatic cylinders as shown in FIG. 5. In either case, the device has been found to have a large overall dimension.

Fresh improvements have since been proposed to provide a small valve drive system capable of developing boosted force in closing operation. One such an example is illustrated in FIG. 6. In the drawing, a metal diaphragm valve (m) includes a pneumatic cylinder (a) having a reciprocating piston (b). A movable shaft (c) is axially affixed to the piston (b) for movement back and forth therewith when the cylinder (a) is pneumatically operated. The shaft (c) is pivotally connected to a lever (e) that is coupled to a cam plate (g) through a pivot (f) that lies slightly off from the center of the cam plate (g). The cam plate (g) is rotatably supported by ball bearings (h) that are arranged to surround the cam plate. A push rod (i) is vertically movably disposed, which is mounted in constant contact at an upper end thereof with the cam (f).

The horizontal movement of the piston (b) is converted through the lever (e) to the cam plate (g) which in turn rotates about the pivot (f) causing the push rod (i) up and down. The vertically reciprocating push rod (i) has a lower end which is used to operate a metal diaphragm (not shown) of the valve (m). The cam plate arrangement is designed to generate greater force to cause the diaphragm to close than the force originally produced by the pneumatic cylinder by first converting it into a rotational movement.

However, the above attempt also has proved to pose problems. For example, the mechanisms developed are complex in design and need many components.

SUMMARY OF THE INVENTION

The present invention has therefore been proposed to provide an improved metal diaphragm free from the above mentioned problems in conventional devices.

A primary object of the present invention is to provide a metal diaphragm valve which is compact and simple in design and comprises a relatively small number of components.

A major object of this invention is to provide such a valve having a means by which the diaphragm of the valve is closed with enhanced force.

The above and other objectives, advantages and superior features of the present invention is insured by the design of the metal diaphragm valve which comprises a pneumatic cylinder having a reciprocating piston, a vertically moving drive rod which, when the pneumatic cylinder is operated, is moved downward by the piston rod, power transmission means for converting the vertical movement of the drive rod into a horizontal movement, and a push rod adapted to turn the horizontal movement back into a vertical motion. A metal diaphragm made of an elastic material is provided, which establishes or close the fluid-flow relationship between an inlet passage and an outlet passage by causing its normally upwardly bulged middle to bob up and down. The push rod is mounted on top of the diaphragm which is operated by the pneumatic cylinder through the drive rod and the push rod.

The steel ball means comprises a number of steel balls that are fittingly placed in an annular groove defined in the top surface of the push rod. The annular groove is cut into a V-shaped cross section and so have opposite slopes. The drive rod has a beveled lower end and the steel balls are arranged to closely enclose the beveled lower end of the drive rod. When the valve is in neutral position, that is, when the pneumatic cylinder is not actuated, the steel balls sit on the inner slope of the groove.

When the pneumatic cylinder is actuated, the drive rod moves downward, forcing the steel balls against the outer slope of the groove. It is so designed that the lateral shift of the steel balls is shorter in distance than the vertical movement of the drive rod, so can develop a larger force in the vertical movement of the push rod to which the steel balls transmits their wedge like force.

The enhancement of force with which the push rod exerts on the diaphragm is determined by adjusting the angle at which the beveled end portion of the drive rod and/or the slope of the groove is cut.

BRIEF EXPLANATION OF THE ACCOMPANYING DRAWINGS

FIG. 2 is an enlarged view of the core portion of FIG. 1, drawn to indicate the operation of the system;

DETAILED DESCRIPTION OF THE PREFERRED EMBODIMENTS

Figure 1:
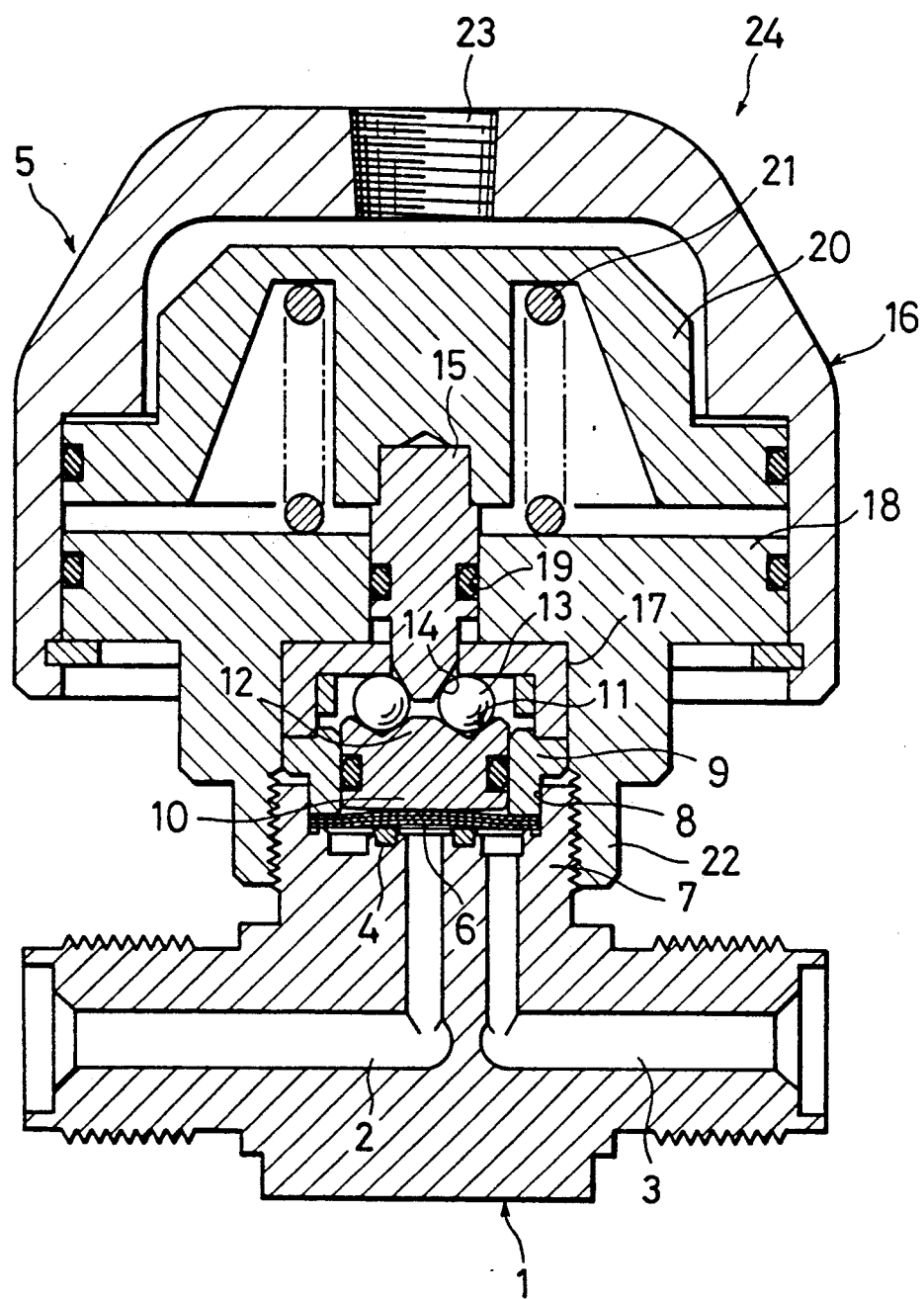
FIG. 1 is a cross-sectional view of a metal diaphragm valve constructed in accordance with a first preferred embodiment of the present invention.

Embodiments of the metal diaphragm valve built according to the present invention will be described in great detail, with reference to the accompanying drawings. In the drawings, like parts are referred to by like numerals.

With respect to FIG. 1, which shows a first embodiment of the metal diaphragm valve 24 of the present invention, a valve casing 1 of an inverted T-configuration is shown, which includes an inlet passage 2 mounted on one side of the casing 1 and an outlet passage 3 on the other side. At an upper open end of the inlet passage 2 is provided an annular valve seat 4 that is formed along a circumferential part of that end. A valve drive system 5 carries at a lower end thereof a circular diaphragm 6 that lies to isolate the valve system from the valve casing 1. The diaphragm 6 is a thin disc made of a thin metal material with sufficient elasticity. The diaphragm 6 may preferably comprise a plurality of plates of equal size overlapped together in tight contact into a high-tension metallic disc.

The diaphragm 6 is mounted inside a vertical sleeve 7 that encloses at a lower base thereof the inlet passage 2 and outlet passage 3, and is clamped along a peripheral portion thereof between an annular top of an inwardly projected ledge 8 formed in the sleeve 7 and a lower end of a cylindrical bonnet 9 that is fittingly inserted into the ledge 8 of the sleeve 7. The diaphragm 6 is elastically held in position so that it, when the valve drive system 5 is in normal unpressurized position, normally bulges upwardly into a first position, as can be best shown in FIG. 2, where the diaphragm is lifted off from the valve seat 4 to establish fluid-flow relationship between the inlet passage 2 and the outlet passage 3. The bonnet 9 is fixedly retained in position in the sleeve 7.

The valve drive system 5 is movably disposed on the bonnet 9 for vertical sliding movement relative to the sleeve 7. The valve drive system 5 includes a valve push rod 10 that is made to move up and down in the annular bonnet 9 relative to the diaphragm 6, an annular groove 11 centrally defined in the top flat surface of the push rod 10. The groove 11 is a V-shaped cross-section cut to receive therein a plurality of steel balls 13 that are largely closely arranged along the groove and shiftably disposed for sliding movement in radial directions between an inner diameter and an outer diameter in the groove 11. There are four steel balls in this particular embodiment, but the number is a matter of choice and any number of balls can be used.

A vertically extending drive rod 15 is movably disposed just above the groove 11 in the valve drive system 5 for vertical movement relative to the bonnet 9, and has a lower end portion 14 of a reduced diameter for constant contact with the steel balls 12. The end portion 14 is beveled at a bottom end thereof to be fittingly received between the opposite inner walls of the balls 12.

Referring to both FIGS. 1 and 2, a pneumatic cylinder 16 is provided at an upper end of the valve drive system 5, which has a vertically movable piston 20 that is upwardly urged by a compression spring 21. The piston 20 is connected to the drive rod 15 that is secured fixedly in a recess formed in a lower surface of the piston 20 for simultaneous movement therewith. The vertical movement of the piston 20 causes the drive rod 15 to move through a bore 19 defined in a stationary base 18 of the pneumatic cylinder 16.

A stopper 17 is mounted on top of the bonnet 9 and has a center bore aligned to the bore 19 above to permit the drive rod 15 to move therethrough. The stopper 17 is provided to hold the steel balls 13 in the groove 11. The V-shaped groove 11 has an outer concentric slope 11a and an inner concentric slope 11b on which the steel balls 13 are normally allowed to sit. The downward movement of the drive rod 15 brings tapered end portion 14 to apply force on the steel balls 13, causing the balls to shift from the inner slope 11b into the outer slope 11a. The pressure exerted on the outer slope 11a by the balls 13 causes the push rod 12 to move downward. As a result, the diaphragm 6, pressured by the push rod 12, to bend down, interrupting the fluid-flow relationship between the inlet passage 2 and the outlet passage 3.

Since the whole system operates pneumatically, an annular seal 12a may preferably be mounted in the bonnet 9 around a circumference of the push rod 12 for sealing purposes. Similarly, another ring seal 18a is mounted in the bore 19 of the cylinder base 18 about a circumference of the drive rod 15.

The stopper 17 is largely annular in cross section and forms a part of the stationary cylinder base 18 that has at a lower end thereof an internally threaded sleeve portion 22 for engagement with an externally threaded portion formed in the sleeve 7 of the valve casing 1. The pneumatic cylinder 16 has at a top portion thereof a port 23 through which the cylinder is supplied with air from an external source (not shown).

The operation of the metal diaphragm valve 24 will be explained with respect to FIG. 2. The air through the supply port 23 activates the pneumatic cylinder 16 (FIG. 1), driving the piston 20 downward. This causes the drive rod 15 to shift forward into the position outlined by broken line in the drawing, bringing its tapered end 14 to dip through the clustered steel balls 13. The steel balls 13 which were held pressed against the inner slope 11b are then pushed against the opposite outer inclined slope 11a, the position described by broken line in the drawing. When a further downward thrust of the drive rod 15 is added, the steel balls exert further force against the outer slope 11a, causing the push rod 12 to come down. The descending push rod 12 depresses the diaphragm 6, which in turn bends down closing the fluid-flow relationship between the inlet passage 2 and outlet passage 3.

The angle at which the tapered end 14 and/or the slope 11a of the groove 11 are cut is determined so that the distance the steel balls shift laterally when the drive rod 15 is lowered, is shorter than that of that downward move of the drive rod 15.

The steel balls 13 transmits the force from a contact point $C_1$ at which contacts between the tapered end 14 and the steel balls 13 to a contact point $C_2$ at which contacts between the slope 11a of the groove 11 and the steel balls 13.

According to the equilibrium laws of the forces in the steel balls 13, when the steel balls 13 were under an action of the downward force at the contact point $C_1$, a generated force at the contact point $C_2$ is greater than the force applied at the contact point $C_1$, then steel balls 13 enhance the force.

As a result, the steel balls transmit a greater force to the push rod 12 than they receive form the drive rod 15. The force exerted by the push rod 12 on the diaphragm 6 would therefore be larger than that developed in the drive rod 15 that transmits force to the steel balls 13.

The steel balls 13 serves as a force transmission system to generate larger pressure at its output than at its input. The mechanism by which the steel balls transmit increased force through the angle of the tapered end 14 and the outer slope 11a provides an additional feature that the force transmitted from the piston 20 to the diaphragm 6 is adjusted by changing that angle.

Referring back to FIG. 1, when the air is allowed to escape through the supply port 23, the pneumatic cylinder 16 is released, permitting the reciprocal piston 20 to move upward in the bore 19 due to the force of the compression spring 20. As a result, Elastic force causes the metal diaphragm 6 to spring back into its original upwardly bulged position, away from the valve seat 4, forcing the push rod 10 up in the sleeve 7. With the upward shift of the push rod 10, the steel balls 13 are moved in radial directions toward the center of the groove 11 in the retainer 12, into their original positions where the balls are pressed against the outer slope 11a of the groove.

Figure 3:
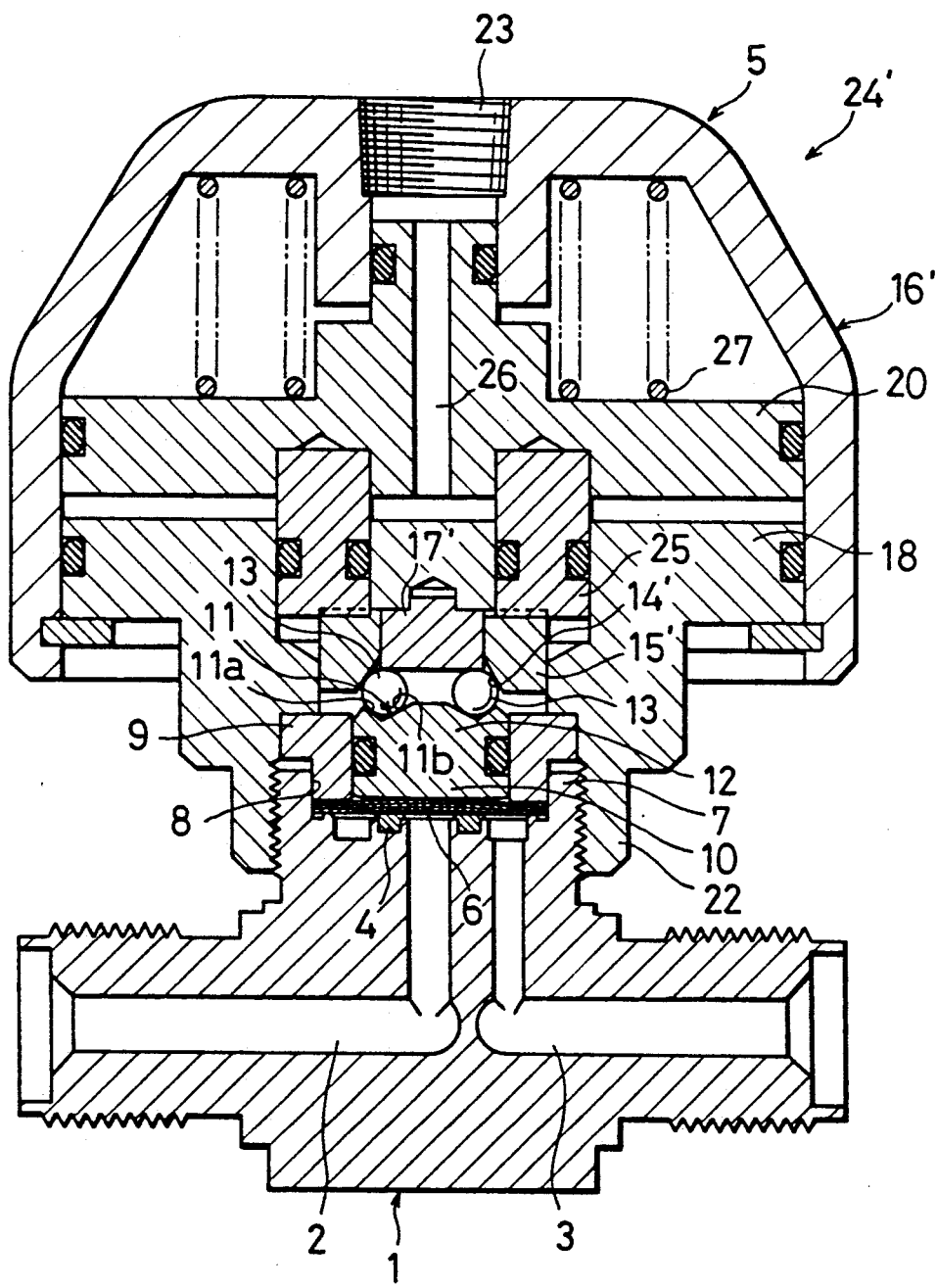
FIG. 3 is a cross sectional view of a metal diaphragm valve build according to another preferred embodiment of the present invention.
Figure 4:
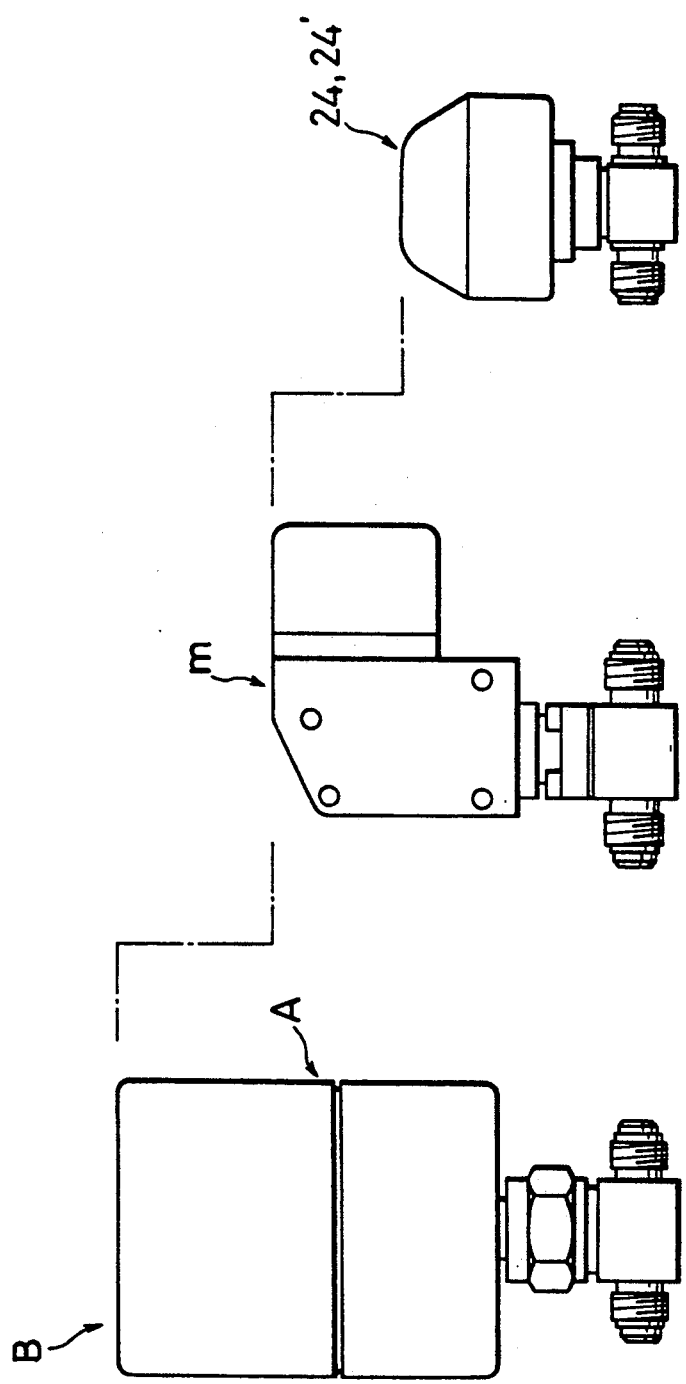
FIG. 4 shows a metal diaphragm valve according to the present invention (at the far left) and two conventional models, presented for comparison of sizes.
Figure 5:
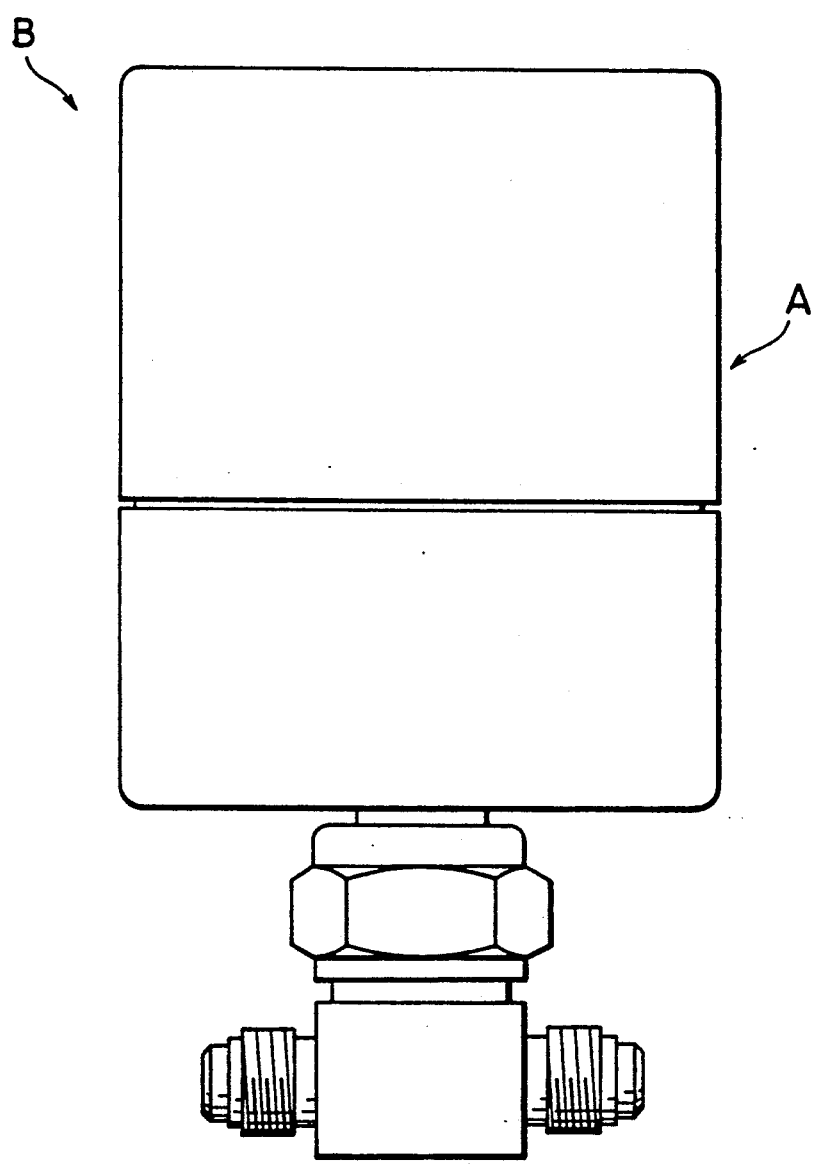
FIG. 5 is an external view of a conventional metal diaphragm of dual pneumatic cylinder type.
Figure 6:
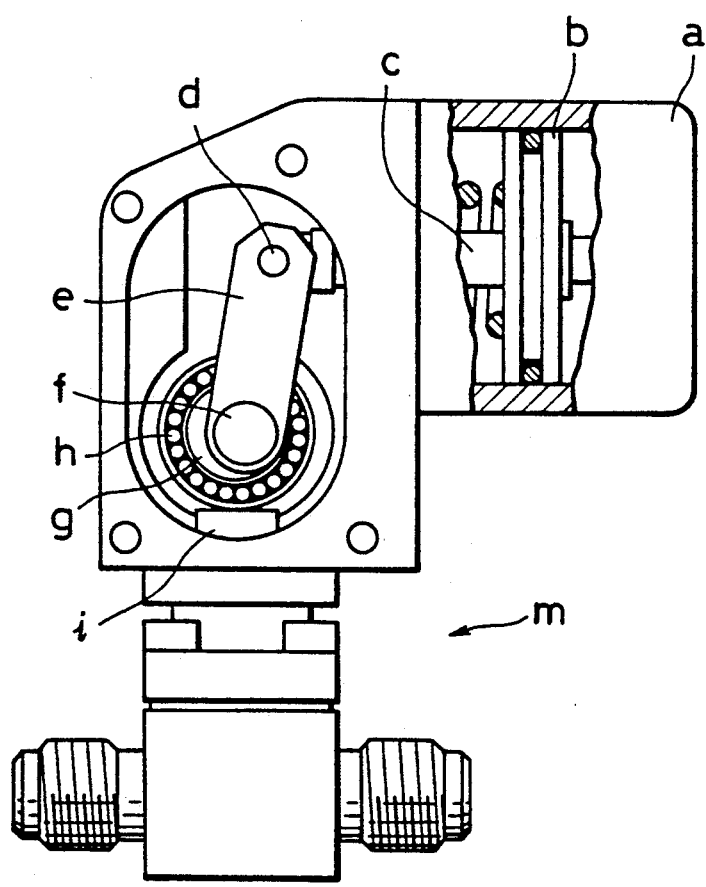
FIG. 6 is a prior art metal diaphragm valve having means to produce increased force with which the diaphragm is closed when a pneumatic cylinder is actuated.

Referring then to FIG. 3, a second embodiment of the metal diaphragm valve 24' will be explained in detail. In this particular embodiment, the drive rod 15 of the above embodiment is replaced by a drive rod 15' that has a different design from the earlier one. The drive rod 15' has at a lower end thereof a tapered cut 14' that has an increasingly large diameter as the cut extends downward. Steel balls 13 are arranged in a circle inside the cut 14'. A stationery stopper 17' is housed inside an upward end of the cut 14', which is provided to lie in contact with the steel balls 13, holding the balls pressed against the outer slope 11a of the groove 11.

The reciprocating piston 20 of the pneumatic cylinder 16' is downwardly urged by compression spring means 27. An air passage 26 runs vertically to interconnect the air port 23 and an air chamber defined below the piston 20. The supply of air into this chamber from the port 23 activates the cylinder 16', causing the piston 20 to move upward against the force of the spring means 27. A plurality of vertically extending push pins 25 are provided, which are affixed at their upper ends to the piston 20. The lower ends of the pins 25 are secured to the drive rod 15. The pins 25, which may preferably be arranged in a circle, are provided to transmit motion from the piston 20 to the push rod 15. To illustrate, when the cylinder 16' is in neutral position, the spring means 27 helds the piston 20 depressed downward.

With the piston 20 in this position, the pins 25 held the push rod 15' downward, with the steel balls 13 pressed against the inner slope 11b of the groove 11. As a result, the push rod 12 is depressed to exert force on the diaphragm 6, which is held against the valve seat 4, with the fluid-flow relationship between the inlet passage 2 and outlet passage 3 closed.

When the port 23 is opened to permit pressurized air into the pneumatic cylinder 16 through the passage 26, the piston 20 is moved upward against the force of the spring means 27, pulling up the drive rod 15' through the pins 25. This causes the steel balls 13 to roll over into the outer slope 11a of the groove 11, releasing the push rod 12. As a result, the elastic diaphragm 6 springs back into an upwardly bend position, establishing a fluid-flow relationship between the inlet passage 2 and outlet passage 3.

The mechanism of this embodiment is substantially the same as the embodiment illustrated by FIG. 1. In this particular embodiment, the force exerted on the diaphragm 6 is ultimately generated by the compression spring means 27 urging the piston 20 downward. This pressure is selected to have an magnitude enough to overcome the pressurized fluid flowing between the inlet passage 2 and outlet passage 3. The angle at which the tapered end 14' and the inner slope 11b of the groove 11 is cut is determined that the steel balls 13, when the cylinder is activated, moves a distance longer than the drive rod 15' shifts to drive the piston 20 upward. The difference in distances develops a larger force in the piston 20 than in the push rod 12.

In either of the preferred embodiments shown above, a pneumatic cylinder is employed as a drive means to move the diaphragm. However, this is a matter of choice, and other suitable drive means can also be used.

It will be easily appreciated that present invention enables designers to assemble a metal diaphragm valve of compact and simple construction which can develop increased pressure in the diaphragm enough to overcome the pressurized fluid in piping systems. In addition, the invention also offers means to adjust the pressure developed in the diaphragm by changing the angle at which the tapered end and/or the slope of the groove is cut.

What is claimed is:

1. A metal diaphragm valve having a diaphragm adapted to close or establish a fluid-flow relationship between an inlet passage and an outlet passage that is enclosed by a valve casing and a valve drive system provided to operate the diaphragm, the valve casing being isolated by the diaphragm from the valve drive system, comprising the diaphragm made of an elastic material and having an upwardly bulged center, a vertically movably disposed push rod, the push rod being operated to press the diaphragm against a valve seat to close the fluid-flow relationship, a circular groove of a substantially V-shaped cross section having a concentric inner slope and a concentric outer slope and defined on a top surface of the push rod, a plurality of steel balls arranged along the groove, the steel balls being laterally shiftably disposed between a first position where the steel balls are held against the inner slope and a second position where the steel balls are held against the outer slope, a stopper mounted in fixed position to lie over the groove and adapted to hold the steel balls in the groove, a vertically movably disposed drive rod having a tapered lower end, the tapered lower end being located above the center of the circular groove and placed in contact with the steel balls, and drive means operatively connected to move the drive rod, the drive rod adapted to normally apply the tapered lower end to the steel balls thereby holding the balls in the first position of the groove when the steel balls engage the stopper to open the fluid flow relationship between the inlet passage and the outlet passage, and drive means operatively connected to the drive rod, wherein the actuation of the drive means forces the drive rod downward, causing the tapered end portion to exert force on the steel balls, forcing the balls to shift into the second position while the steel balls are maintained in abutting engagement with the stopper, so that the push rod is caused to generate the enhanced transmitting force to move down to depress the diaphragm to close the fluid-flow relationship between the inlet passage and the outlet passage.

2. A device as set forth in claim 1, wherein the drive means is a pneumatic cylinder having a piston which is driven by compressed air to move the drive rod.

3. A device as set forth in claim 1, wherein the drive means is a manually operated system.

4. A metal diaphragm valve having a diaphragm adapted to close or establish a fluid-flow relationship between an inlet passage and an outlet passage that is enclosed by a valve casing and a valve system provided to operate the diaphragm, the valve casing being isolated by the diaphragm from the valve system, comprising the diaphragm made of an elastic material and having an upwardly bulged center, a vertically movably disposed push rod adapted to normally hold the diaphragm pressed against a valve seat to close the fluid-flow relationship, a circular groove of a substantially V-shaped cross section having a concentric inner slope and a concentric outer slope and defined on a top surface of the pushes rod, a plurality of steel balls arranged along the groove, the steel balls being laterally shiftably disposed between a first position where the steel balls are pressed against the inner slope and a second position where the steel balls are pressed against the outer slope, a stopper mounted in fixed position to overlie the groove and adapted to hold the steel balls in the groove, a vertically movably disposed drive rod having at a lower end thereof a cavity with a tapered wall portion, the stopper being mounted within the cavity, the tapered wall portion being adapted to normally hold the steel balls pressed against the first position, and compression spring means adapted to exert downward force on the drive rod so as to keep the steel balls in the first position to close the fluid-flow relationship between the inlet passage and the outlet passage, drive means operatively connected to the drive rod, wherein the actuation of the drive means causes the drive rod to move upward against the force of the compression spring means to release the force exerted by the tapered wall portion on the steel balls, allowing the balls to shift into the second position of the groove, so that the diaphragm is allowed to lift up to establish a fluid-flow relationship between the inlet and the outlet passage.

5. A device as set forth in claim 4, wherein the drive means is a pneumatic cylinder having a reciprocating piston which is operated by compressed air to move the drive rod.

6. A device as set forth in claim 4, wherein the drive means is a manually operated system.

7. A device as set forth in claim 1, 2, 3, 4, 5 or 6, wherein the angle at which the V-shaped circular groove is cut to receive the steel balls is selected to determine the distance of the lateral shift the balls make between the first position and second position when the drive rod is moved.

8. A device as set forth in claim 1, 2, 3, 4, 5 or 6, wherein the angle at which the tapered lower end of the drive rod is cut for close contact with the steel balls is selected to determine the distance of the lateral shift the balls make between the first position and second position when the drive rod is moved.

* * * * *